US009215269B2

United States Patent
Freeman, II et al.

(10) Patent No.: US 9,215,269 B2
(45) Date of Patent: Dec. 15, 2015

(54) PREDICTIVE CACHING FOR CONTENT

(75) Inventors: James Marvin Freeman, II, Seattle, WA (US); Aaron M. Bromberg, Mountain View, CA (US); Bryant F. Herron-Patmon, Seattle, WA (US); Nush Karmacharya, Seattle, WA (US); Joshua B. Barnard, Seattle, WA (US); Peter Wei-Chih Chen, Everett, WA (US); Stephen A. Slotnick, Seattle, WA (US); Abhishek Dubey, Seattle, WA (US); Andrew J. Watts, Seattle, WA (US); Richard J. Winograd, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 578 days.

(21) Appl. No.: 13/592,752

(22) Filed: Aug. 23, 2012

(65) Prior Publication Data
US 2014/0059156 A1 Feb. 27, 2014

(51) Int. Cl.
*G06F 15/16* (2006.01)
*H04N 5/445* (2011.01)
*H04L 29/08* (2006.01)
*G06F 15/167* (2006.01)
*H04L 29/06* (2006.01)

(52) U.S. Cl.
CPC ............. *H04L 67/10* (2013.01); *G06F 15/167* (2013.01); *H04L 63/061* (2013.01); *H04L 65/4084* (2013.01); *H04L 67/22* (2013.01); *H04L 67/28* (2013.01); *H04L 67/306* (2013.01); *H04L 2463/101* (2013.01)

(58) Field of Classification Search
CPC ............ H04L 67/2842; H04L 67/2847; H04L 67/306; H04L 67/1097; H04L 67/10; H04L 67/22; H04L 67/28; H04L 65/4084; H04L 2463/101; G06F 17/30902; G06F 17/30867; G06F 12/0802; G06F 15/167; G06Q 30/00
USPC .......... 709/203, 217–219; 711/137; 705/7.26; 725/46
See application file for complete search history.

(56) References Cited

U.S. PATENT DOCUMENTS

| | | | | |
|---|---|---|---|---|
| 6,016,520 A | * | 1/2000 | Facq et al. | 710/33 |
| 6,571,279 B1 | * | 5/2003 | Herz et al. | 709/217 |
| 6,671,424 B1 | * | 12/2003 | Skoll et al. | 382/305 |
| 6,766,376 B2 | * | 7/2004 | Price | 709/231 |
| 7,403,618 B2 | * | 7/2008 | Van Rijnsoever et al. | 380/239 |

(Continued)

OTHER PUBLICATIONS

U.S. Appl. No. 61/683,187 entitled "Speculative Pre-Authorization of Encrypted Data Streams" and filed on Aug. 14, 2012.

(Continued)

*Primary Examiner* — Viet Vu
*Assistant Examiner* — Michael A Chambers
(74) *Attorney, Agent, or Firm* — Thomas | Horstemeyer, LLP

(57) ABSTRACT

Disclosed are various embodiments for predictive caching of content to facilitate instantaneous use of the content. If a user is likely to commence use of a content item through a client, and if the client has available resources to facilitate instantaneous use, the client is configured to predictively cache the content item before the user commences use. In doing so, the client may obtain metadata for the content item and an initial portion of the content item from a server. The client may then initialize various resources to facilitate instantaneous use of the content item by the client based at least in part on the metadata and the initial portion.

29 Claims, 6 Drawing Sheets

(56) References Cited

U.S. PATENT DOCUMENTS

| | | | |
|---|---|---|---|
| 7,565,399 B1* | 7/2009 | Goel | 709/203 |
| 7,630,986 B1* | 12/2009 | Herz et al. | 1/1 |
| 7,941,092 B2* | 5/2011 | Rao | 455/3.04 |
| 8,078,096 B2* | 12/2011 | Rao | 455/3.04 |
| 8,180,276 B2* | 5/2012 | Rao | 455/3.04 |
| 8,385,813 B2* | 2/2013 | Rao | 455/3.04 |
| 8,489,673 B2* | 7/2013 | Sebastian et al. | 709/203 |
| 8,745,158 B2* | 6/2014 | Claman et al. | 709/217 |
| 8,898,708 B2* | 11/2014 | Rao | 725/74 |
| 2002/0069132 A1* | 6/2002 | Perkes et al. | 705/26 |
| 2004/0252967 A1* | 12/2004 | Sheu et al. | 386/46 |
| 2006/0062363 A1* | 3/2006 | Albrett | 379/101.01 |
| 2006/0069749 A1* | 3/2006 | Herz et al. | 709/219 |
| 2007/0179854 A1* | 8/2007 | Ziv et al. | 705/14 |
| 2008/0095370 A1* | 4/2008 | Rose et al. | 380/278 |
| 2008/0119132 A1* | 5/2008 | Rao | 455/3.04 |
| 2008/0270579 A1* | 10/2008 | Herz et al. | 709/219 |
| 2008/0310815 A1* | 12/2008 | He et al. | 386/46 |
| 2009/0254971 A1* | 10/2009 | Herz et al. | 726/1 |
| 2009/0288112 A1* | 11/2009 | Kandekar et al. | 725/32 |
| 2009/0288131 A1* | 11/2009 | Kandekar et al. | 725/133 |
| 2010/0138865 A1* | 6/2010 | Rai et al. | 725/44 |
| 2010/0169502 A1* | 7/2010 | Knowlson et al. | 709/231 |
| 2010/0251305 A1* | 9/2010 | Kimble et al. | 725/46 |
| 2011/0047134 A1* | 2/2011 | Zhang et al. | 707/702 |
| 2011/0093900 A1* | 4/2011 | Patel et al. | 725/54 |
| 2011/0103374 A1* | 5/2011 | Lajoie et al. | 370/352 |
| 2011/0177773 A1* | 7/2011 | Rao | 455/3.04 |
| 2011/0197236 A1* | 8/2011 | Rao | 725/74 |
| 2011/0202383 A1* | 8/2011 | Rao | 705/7.19 |
| 2012/0042050 A1* | 2/2012 | Chen et al. | 709/219 |
| 2012/0252352 A1* | 10/2012 | Rao | 455/3.04 |
| 2013/0031211 A1* | 1/2013 | Johnson et al. | 709/218 |

OTHER PUBLICATIONS

International Searching Authority and Written Opinion mailed Mar. 13, 2014 for PCT/US2013/055980 filed Aug. 21, 2013.

* cited by examiner

PREDICTIVE CACHING FOR CONTENT

BACKGROUND

Network-based delivery of media content has largely supplanted other forms of media content delivery, such as brick-and-mortar video sales and rental stores, mail-based video rental services, and so on. Instead of traveling a few miles to a physical store or waiting days for a title to arrive by mail, users may select media content titles to stream to their devices over high-speed broadband connections. Consequently, users are quickly growing accustomed to near-immediate delivery of media content. Rising user expectations may lead to frustration when playback does not begin immediately upon user selection of a media content title.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to predictive caching for content items such as, for example, movies, television programs, music, video clips, audio clips, applications, and so on. Such content is increasingly offered through network streaming or progressive download. If the network connection of the user has bandwidth exceeding the bitrate of the content, the content can be played back or otherwise used while it is being downloaded or streamed. Despite having the network bandwidth to support streaming, users may still experience delay after initially selecting a content item for use. For example, playback may be delayed for several seconds, leading to user frustration. This delay may be due to the initial filling of buffers in the client with portions of the content item; launching and initializing various software and/or hardware components in the client to perform decryption, decoding, or other functions; or other causes.

Various embodiments of the present disclosure enable instantaneous, or near instantaneous, playback of network-streamed or progressively downloaded content by predictively caching initial portions of content items that a user is likely to playback or use. The predictive caching may involve downloading initial portions of the content item in advance, downloading metadata including manifest files and decryption keys, decrypting the initial portions of the content items, performing configuration tasks, performing initialization tasks, and/or performing other tasks relating to preparing a content item for playback. The predictive cache may be maintained and updated according to available data storage, available network bandwidth, recommendations data, real-time user behavior data, and/or other factors.

Figure 1A:
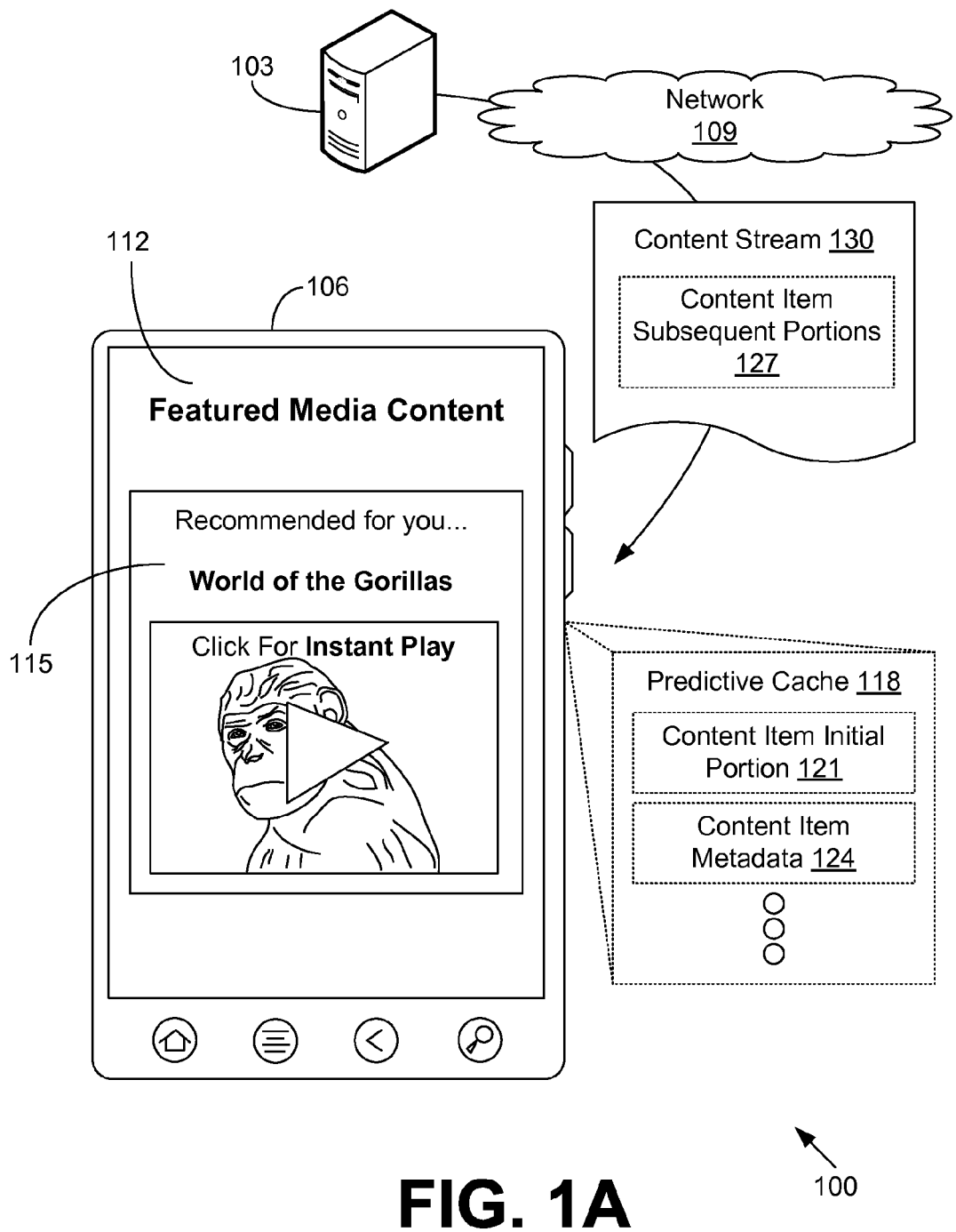
FIG. 1A is a drawing presenting one example of operation of a networked environment according to various embodiments of the present disclosure.

With reference to FIG. 1A, shown is one example of operation for a networked environment 100 according to various embodiments. The networked environment 100 includes a computing environment 103 in data communication with one or more clients 106 via a network 109. The client 106 is rendering a user interface 112 that allows a user to browse content items that are available for playback or use. A recommendation 115 is rendered in the user interface 112 in this non-limiting example. The recommendation 115 recommends to the user a movie ("World of the Gorillas") that has been predictively cached in the client 106 for instantaneous playback.

The client 106 includes a predictive cache 118 in memory that stores a content item initial portion 121 and content item metadata 124 for each predictively cached content item. Through predictive caching, the client 106 is configured to obtain the content item initial portion 121 and the content item metadata 124 from the computing environment 103 over the network 109 before the user at the client 106 requests use or playback of the content item. Further, the client 106 may initialize various software and/or hardware components based at least in part on the content item initial portion 121 and/or the content item metadata 124 in order to provide an instantaneous use experience when the user selects the content item for use.

After the user requests use of the content item, the client 106 may then begin to obtain content item subsequent portions 127 in a content stream 130 over the network 109 from the computing environment 103. Thus, as the client 106 exhausts use of the content item initial portion 121, the client 106 may seamlessly continue use of the content item subsequent portions 127. In the following discussion, a general description of the system and its components is provided, followed by a discussion of the operation of the same.

Figure 1B:
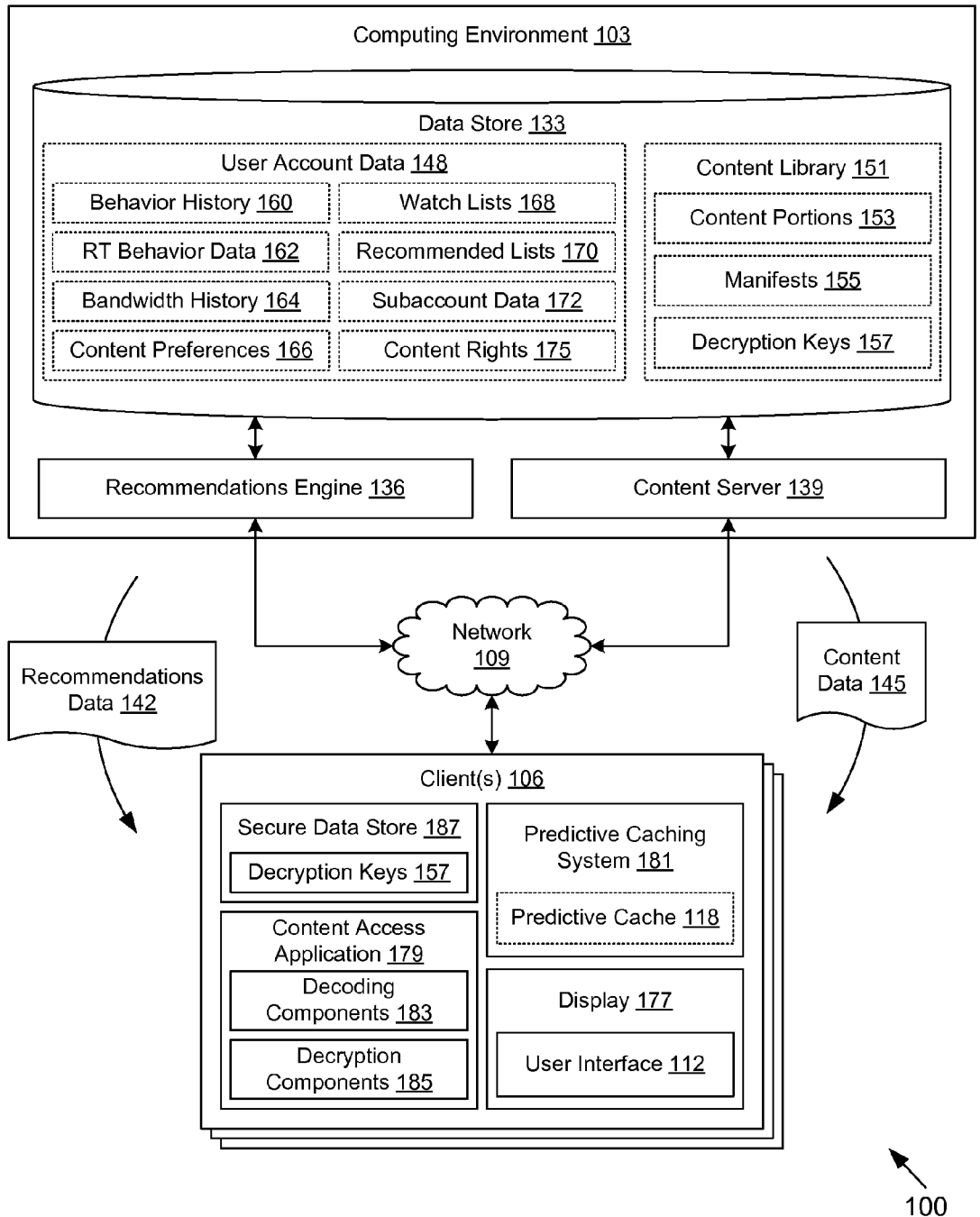
FIG. 1B is a drawing presenting a detailed view of the networked environment of FIG. 1A according to various embodiments of the present disclosure.

Turning now to FIG. 1B, shown is a detailed view of the networked environment 100 according to various embodiments. The networked environment 100 includes the computing environment 103 in data communication with one or more clients 106 via the network 109. The network 109 includes, for example, the Internet, intranets, extranets, wide area networks (WANs), local area networks (LANs), wired networks, wireless networks, or other suitable networks, etc., or any combination of two or more such networks.

The computing environment 103 may comprise, for example, a server computer or any other system providing computing capability. Alternatively, the computing environment 103 may employ a plurality of computing devices that may be employed that are arranged, for example, in one or more server banks or computer banks or other arrangements. Such computing devices may be located in a single installation or may be distributed among many different geographical locations. For example, the computing environment 103 may include a plurality of computing devices that together may comprise a cloud computing resource, a grid computing resource, a content delivery network, and/or any other distributed computing arrangement. In some cases, the computing environment 103 may correspond to an elastic computing resource where the allotted capacity of processing, network, storage, or other computing-related resources may vary over time.

Various applications and/or other functionality may be executed in the computing environment 103 according to various embodiments. Also, various data is stored in a data store 133 that is accessible to the computing environment 103. The data store 133 may be representative of a plurality of data stores 133 as can be appreciated. The data stored in the data store 133, for example, is associated with the operation of the various applications and/or functional entities described below.

The components executed on the computing environment 103, for example, include a recommendations engine 136, a content server 139, and other applications, services, processes, systems, engines, or functionality not discussed in detail herein. The recommendations engine 136 is executed to generate a list of recommended content for a user. To this end, the recommendations engine 136 may analyze various behavioral data collected regarding the user. The list of recommended content corresponds to content that the user is likely to playback or consume. The list may include relative priorities for the recommended content. The list may be sent to the client 106 over the network 109 as recommendations data 142.

The content server 139 is executed to serve up content items and associated data to users at clients 106. To this end, the content server 139 is configured to send content data 145 to the client 106 via the network 109. In addition, the content server 139 may generate and send user interface data to the client 106 to facilitate user browsing, searching, and/or selection of content. Such user interface data may correspond to web page data, mobile application data, and/or other forms of user. Such user interface data may include hypertext markup language (HTML), extensible markup language (XML), cascading style sheets (CSS), and/or other data. In one embodiment, the content server 139 may send directives to the client 106 that instruct the client 106 to predictively cache preselected content items.

The data stored in the data store 133 includes, for example, user account data 148, a content library 151, and potentially other data. The content library 151 includes data relating to content items that are made available by the content server 139 for playback, download, viewing, lease, purchase, etc. Such content items may include, for example, movies, television shows, music, music videos, video clips, audio clips, applications such as mobile applications, and so on. The content library 151 may include content portions 153, metadata such as manifests 155 and decryption keys 157, and/or other data.

Each of the content portions 153 may correspond to a distinct time segment of the particular content item. In some cases, multiple alternative content portions 153 may be provided for time segments, e.g., both English and Spanish language audio tracks, different bitrates with different encoding qualities, and so on. The content portions 153 may include Moving Pictures Experts Group (MPEG) video data, H.264 data, Flash® media data, MPEG layer 3 (MP3) audio data, Dolby Digital® audio data, Advanced Audio Coding (AAC) audio data, data for subtitles, etc.

The manifests 155 may describe, for example, how a particular content item is made up of various content portions 153. The manifest 155 may include identifiers for content portions 153 that make up the content item along with sequence-specifying data so that the client 106 can obtain and render the content portions 153 in the correct order. The manifest 155 may also identify various alternative content portions 153 for a content item such as, for example, alternative languages, alternative bitrates, and other alternatives. In some cases, the manifest 155 may provide license-related information, including the location of the decryption keys 157.

The decryption keys 157 may be employed by the client 106 to decrypt content portions 153 which are encrypted under digital rights management (DRM) technologies. A decryption key 157 may be sent along with the content portions 153 if the client 106 has rights to the corresponding content item. The rights to the corresponding content item may expire at a particular time, after a time period, upon a certain number of plays for the content item, or at some other time. Thus, the decryption keys 157 may be configured to expire in response to expiration of the rights of the client 106 to the corresponding content item. In some embodiments, the decryption keys 157 may be referred to as "licenses" for the corresponding content items.

The user account data 148 may include various data associated with user accounts with the content server 139. Such accounts may be explicitly registered and configured by users or may be created implicitly based on client 106 interaction with the content server 139. The user account data 148 may include, for example, behavior history 160, real-time behavior data 162, bandwidth history 164, content preferences 166, watch lists 168, recommended lists 170, subaccount data 172, content rights 175, and other data. In addition, security credentials, contact information, payment instruments, and/or other user-related data may be stored in the user account data 148.

The behavior history 160 describes historical behavior of the user associated with the user account. Such behavior may include a content consumption history describing which content items the user has viewed, downloaded, purchased, etc. In one example, the content consumption history corresponds to a media consumption history indicating which media content items the user has viewed, downloaded, purchased, etc. Such behavior may also include a browse history tracking network pages or content the user has previously accessed, a search history tracking previous search queries, subscription history, purchase and browse history for non-content items, and/or other forms of online behavior.

The real-time behavior data 162 may include data describing what the user is currently doing, e.g., what content the user is currently browsing, what search queries the user is currently executing, what search results are being displayed to the user, etc. The real-time behavior data 162 may be observed by the content server 139 or collected from reports by the client 106. For example, the client 106 may be configured to report to the content server 139 that the user is hovering a cursor over a description of a certain content item in a user interface. In some embodiments, the real-time behavior data 162 may be maintained in the client 106 rather than the computing environment 103.

The bandwidth history 164 profiles the network bandwidth available for the user through the client 106. The bandwidth history 164 may be employed to select from among multiple bitrates of content items automatically for predictive caching. If the user employs multiple clients 106, multiple profiles may be created in the bandwidth history 164. Also, multiple location-dependent profiles may be created for clients 106 that are mobile devices. As a non-limiting example, a user may have third-generation (3G) cellular data access at an office location, but high-speed Wi-Fi data access at a home location, thereby resulting in multiple location-dependent bandwidth profiles for the same client 106 in the bandwidth history 164.

The content preferences 166 include various preferences inferred from user behavior or explicitly configured by users. Such preferences may be relating to media content quality (e.g., bitrate, codec, etc.), language preferences, subtitle preferences, closed captioning preferences, supplemental content preferences (e.g., relating to directors' or actors' commentaries, etc.), parental control preferences, and so on. The watch lists 168 may correspond to lists of content items in which users have explicitly indicated that they desire to consume the content at some time in the future. The recommended lists 170 correspond to lists of recommended content items generated for each user by the recommendations engine 136.

The subaccount data 172 may be employed to describe preferences or behaviors that differ across multiple users of a user account. For instance, a family may have a single user account but subaccounts for each member of the family. Each user may explicitly log in to a subaccount, or the subaccount may be inferred based on time of day, day of the week, identity or type of the client 106, location of the client 106, and/or other factors. In some cases, one user may be associated with multiple subaccounts. Further, a subaccount may be associated with multiple users. The subaccount data 172 may specify restrictions on content access in some cases. As a non-limiting example, a subaccount for a child may be limited to access only child-friendly content from approved sources. In some cases, different subaccounts may be associated with different clients 106.

The content rights 175 may describe the rights to content which are associated with the user account. For example, a user may have a subscription to certain content or all content available through the content server 139. Such a subscription may be for indefinite use of the accessed content, time-limited use, device-limited use, and/or other licensing arrangements. Alternatively, a user may purchase or lease content on a per-content-item basis.

The client 106 is representative of a plurality of client devices that may be coupled to the network 109. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability. The client 106 may include a display 177. The display 177 may comprise, for example, one or more devices such as liquid crystal display (LCD) displays, gas plasma-based flat panel displays, organic light emitting diode (OLED) displays, LCD projectors, or other types of display devices, etc.

The client 106 may be configured to execute various applications such as a content access application 179, a predictive caching system 181, and/or other applications. The content access application 179 may be executed in the client 106, for example, to access and render content items from the computing environment 103 and/or other servers. Moreover, the content access application 179 may access various other network content served up by the computing environment 103 and/or other servers, thereby rendering a user interface 112 on the display 177. The content access application 179 may provide various media player functionality including, for example, initiating playback, stopping playback, pausing playback, adjusting volume, setting preferences, browsing for media content, searching for media content, recommending media content by rendering recommendations 115 (FIG. 1A), and so on. The content access application 179 may include various decoding components 183 and decryption components 185 corresponding to logic that facilitates playback of content items. Where the content corresponds to applications, the content access application 179 may facilitate progressive download and execution of applications.

The predictive caching system 181 is executed to predict various content items that the user is likely to access and to cache content item initial portions 121 (FIG. 1A) and content item metadata 124 (FIG. 1A) in the predictive cache 118 to facilitate instantaneous use. The predictive caching system 181 may also initialize various decoding components 183, decryption components 185, etc. for content items in the predictive cache 118. The size of the predictive cache 118 may depend, for example, on user-configured parameters, the available data storage in the client 106, the bandwidth available to the client 106 over the network 109, or on other factors. In various embodiments, the client 106 may be configured to make predictive caching decisions or the computing environment 103 may be configured to make predictive caching decisions.

The client 106 may also include a secure data store 187 for storage of decryption keys 157 used in decrypting content items to which the user has rights in the client 106. The secure data store 187 may comply with various rules regarding security for storage of DRM licenses. The secure data store 187 may have relatively limited storage space for decryption keys 157. In some cases, the limited storage space in the secure data store 187 may in turn limit the size of the predictive cache 118. The predictive caching system 181 may be configured to install the decryption keys 157 in the secure data store 187 which the corresponding content items are predictively cached. The client 106 may be configured to execute applications beyond the content access application 179 and the predictive caching system 181 such as, for example, browsers, mobile applications, email applications, social networking applications, and/or other applications.

Next, a general description of the operation of the various components of the networked environment 100 is provided. To begin, users may register and interact with the content server 139 such that behavior history 160 (e.g., consumption history, etc.), bandwidth history 164, content preferences 166, watch lists 168, and/or other data in the user account data 148 is created for a content access account. The recommendations engine 136 may process this data in order to generate the recommended lists 170 for the users. In some cases, the recommended lists 170 may be based on real-time behavior data 162 associated with the users. Such real-time behavior data 162 may, for example, describe a listing of content items being presented to the user a user interface, a listing of search results generated in response to a search query obtained from the user, and so on. The recommended lists 170 may depend further on the time of day, the day of the week, which subaccount is active, etc.

The recommended lists 170 and/or other data used to generate recommendations may be sent to the client 106 as recommendations data 142. From a list of recommended content items, the predictive caching system 181 selects a subset of the list based at least in part on a respective priority of the content items, an available data storage for the client 106, available storage in the secure data store 187, available bandwidth, power state in the client 106, costs associated with the network 109 connection to the client 106, type of network 109 connection to the client 106, configuration parameters, and/or other factors. In one embodiment, the predictive caching system 181 determines the selected subset according to a directive from the computing environment 103.

The predictive caching system 181 proceeds to predictively cache the content items in the selected subset. In doing so, the predictive caching system 181 may prepare the client 106 for instantaneous use or playback of the selected subset of content items before the user selects any of the selected subset of content items for use. To this end, the predictive caching system 181 may obtain initial portions from the content portions 153 and metadata such as manifests 155 and decryption keys 157 from the content server 139.

The content portions 153 may be sent in a decrypted format. To handle this, the predictive caching system 181 may obtain decryption keys 157, which are then installed in the secure data store 187 to handle the decryption. The predictive caching system 181 may spin up and initialize hardware and/or software resources of the client 106, to include, for example, decoding components 183, decryption components 185, and other components of the content access application 179. Thus, the predictive caching system 181 may perform some processing relative to the metadata and/or the initial portion of the content item in order to prepare the client 106 for instantaneous playback of the predictively cached content items prior to the user explicitly indicating that use or playback is desired.

Instantaneously available use may then be provided by the content access application 179 when any of the selected subset of content items is selected for use or playback by the user. The content access application 179 is configured to stream the selected content item from the content server 139 as a content stream 130. Although described as "instantaneous" playback, it is understood that such playback may include a fade transition or other transition in order to avoid a jarring experience of cutting directly to playback.

Figure 2:
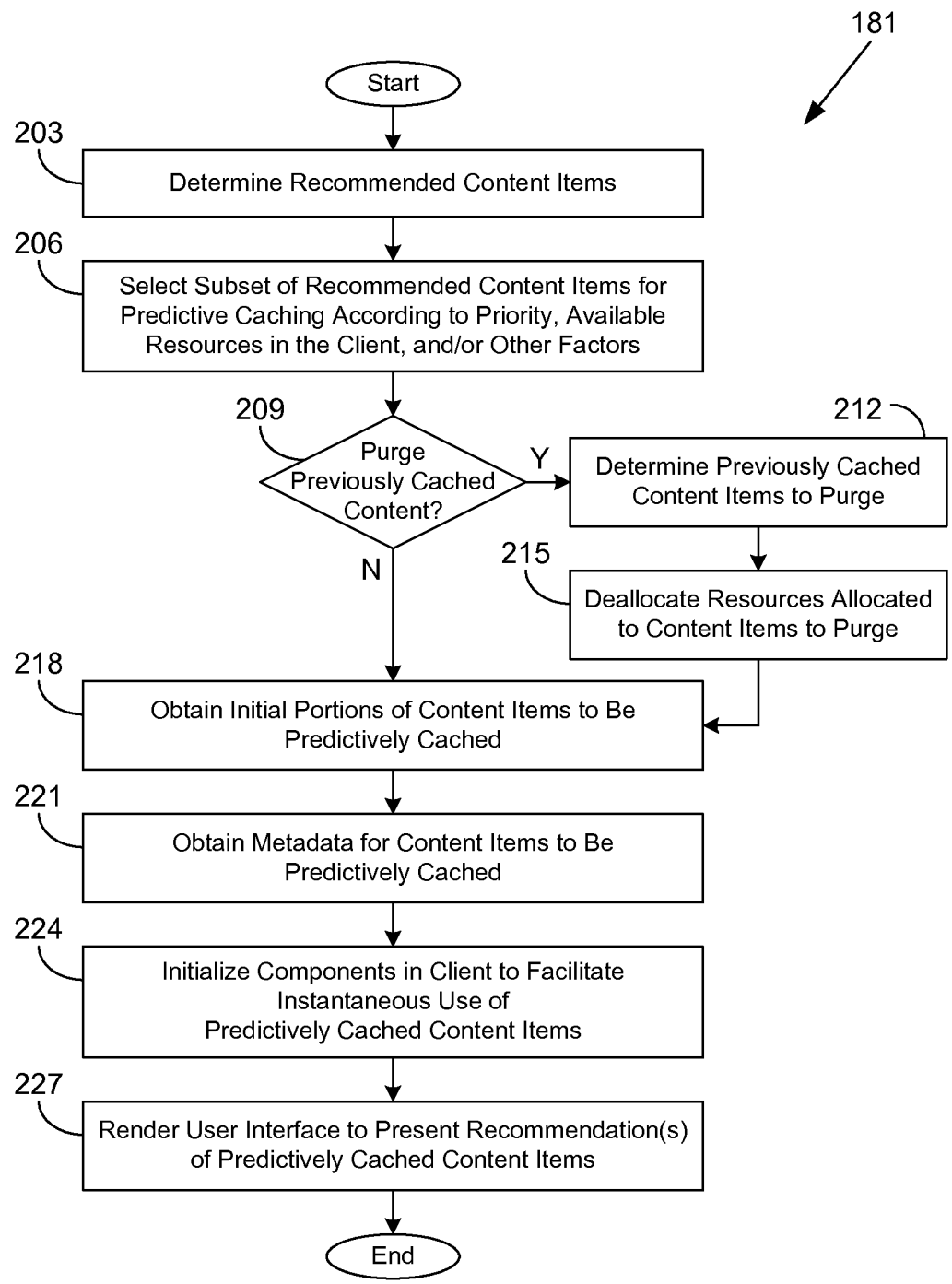
FIG. 2 is a flowchart illustrating one example of functionality implemented as portions of a predictive caching system executed in a client in the networked environment of FIG. 1B according to various embodiments of the present disclosure.

Referring next to FIG. 2, shown is a flowchart that provides one example of the operation of a portion of the predictive caching system 181 according to various embodiments. It is understood that the flowchart of FIG. 2 provides merely an example of the many different types of functional arrangements that may be employed to implement the operation of the portion of the predictive caching system 181 as described herein. As an alternative, the flowchart of FIG. 2 may be viewed as depicting an example of steps of a method implemented in the client 106 (FIGS. 1A & 1B) according to one or more embodiments.

Beginning with box 203, the predictive caching system 181 determines a list of recommended content items. To this end, the predictive caching system 181 may obtain recommendations data 142 (FIG. 1B) from the computing environment 103 (FIG. 1B). Such recommendations data 142 may be generated based at least in part on, for example, behavior history 160 (FIG. 1B) including content consumption history, content preferences 166 (FIG. 1B), real-time behavior data 162 (FIG. 1B), and/or other data. In some embodiments, the predictive caching system 181 may generate at least a part of the list of recommended content items from real-time behavior data 162 available in the client 106. The list of recommended content items may have a priority associated with each content item in the list. Such a priority may indicate a relative likelihood that the user will want to consume the particular content item.

In box 206, the predictive caching system 181 selects a subset of the list of recommended content items to be predictively cached. The selection may be driven by priority of the respective content items, available resources in the client 106 (e.g., available memory or data storage allocated for the predictive cache 118 (FIGS. 1A & 1B), available storage in the secure data store 187 (FIG. 1B), available bandwidth on the network 109 (FIGS. 1A & 1B) for the client 106, bandwidth history 164 (FIG. 1B), content preferences 166 (FIG. 1B), real-time behavior data 162 available to the client 106, configuration parameters, and/or other factors.

In box 209, the predictive caching system 181 determines whether previously cached content from the predictive cache 118 is to be purged. Such content may be purged in order to free up resources for other content that is determined to be more likely to be consumed by the user. The previously cached content may also be rendered obsolete by a change to the factors which prompted its initial selection to be predictively cached, e.g., if the content is no longer timely, if the real-time behavior of the user that prompted the predictive caching of the content has changed, if the user has completed consuming the content, and so on. In some cases, the user may explicitly request that content be purged from the cache.

If previously cached content is to be purged, the predictive caching system 181 moves from box 209 to box 212 and determines which of the previously cached content items are to be purged. In some cases, the user may explicitly identify which content is to be purged. In box 215, the predictive caching system 181 deallocates resources in the client 106 that had been allocated to the content items that are to be purged. In doing so, the predictive caching system 181 may, for example, remove content item initial portions 121 (FIG. 1A) from the predictive cache 118, remove content item metadata 124 (FIG. 1A) from the predictive cache 118, remove unnecessary decryption keys 157 (FIG. 1B) from the secure data store 187, terminate unnecessary decoding components 183 (FIG. 1B) or decryption components 185 (FIG. 1B), and so on. The predictive caching system 181 then proceeds to box 218. If the predictive caching system 181 instead decides not to purge previously cached content, the predictive caching system 181 moves from box 209 to box 218.

In box 218, the predictive caching system 181 obtains content item initial portions 121 from the content server 139 (FIG. 1B) for the content items that are to be predictively cached. The initial portions may correspond to the beginning of the content item, a location where the user left off in consuming the content item, a popular location within the content item, and/or other starting portions within the content item. In box 221, the predictive caching system 181 obtains content item metadata 124 for the content items that are to be predictively cached. Such content item metadata 124 may include, for example, manifests 155 (FIG. 1B), decryption keys 157, and/or other metadata. In box 224, the predictive caching system 181 initializes various components in the client 106 to facilitate instantaneous use or playback of the predictively cached content items. This may include, for example, launching and/or initializing decoding components 183 and/or decryption components 185, storing decryption keys 157 in the secure data store 187, and/or performing other tasks.

In box 227, the predictive caching system 181 may render a user interface 112 (FIGS. 1A & 1B) to present recommendations 115 (FIG. 1A) of predictively cached content items. By recommending such predictively cached content items, the likelihood that the user will select content that has been predictively cached may be increased, thereby increasing the likelihood of a positive user experience resulting from instantaneous use. Thereafter, the portion of the predictive caching system 181 ends.

Figure 3:
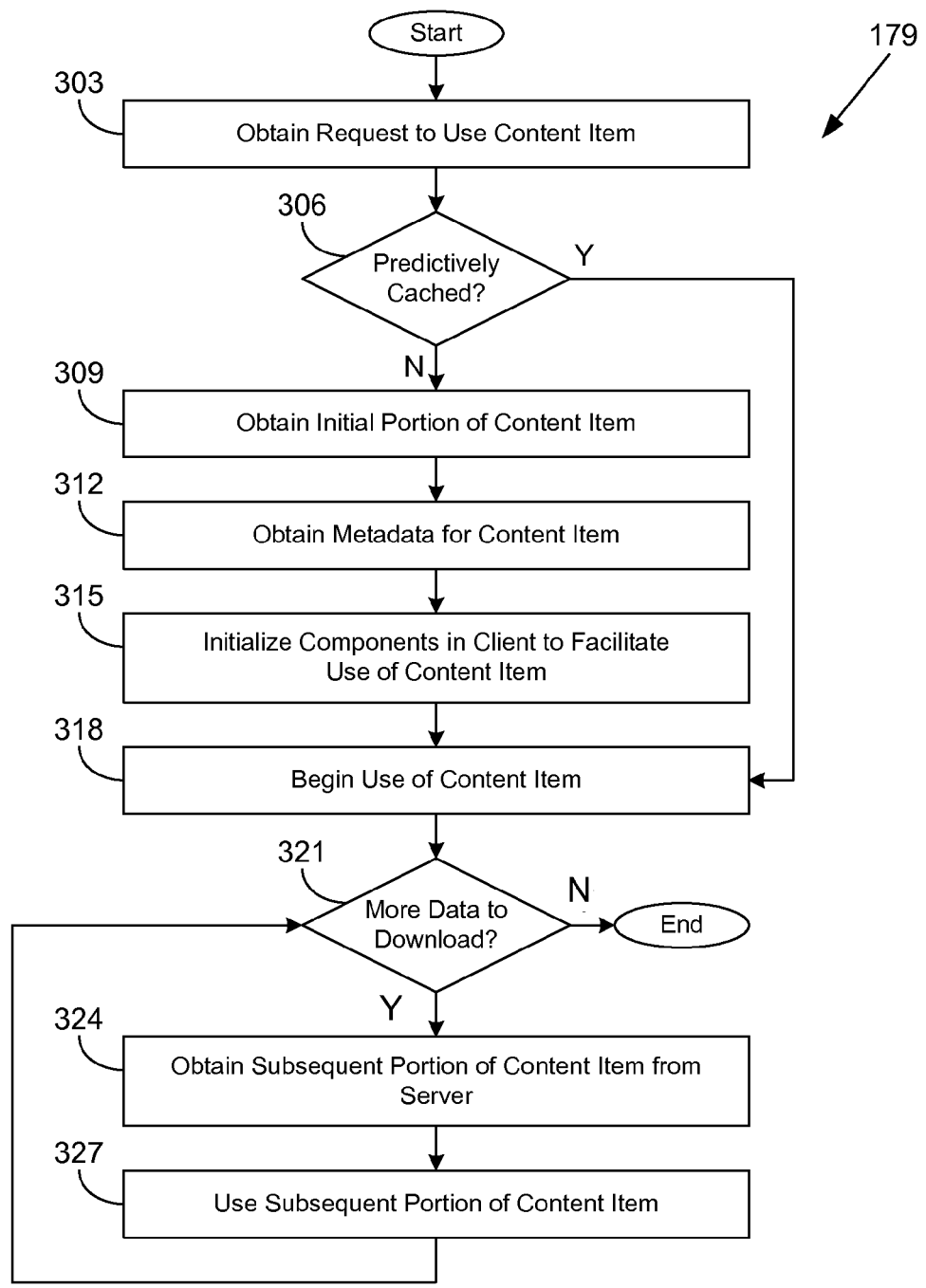
FIG. 3 is a flowchart illustrating one example of functionality implemented as portions of a content access application executed in a client in the networked environment of FIG. 1B according to various embodiments of the present disclosure.

Turning now to FIG. 3, shown is a flowchart that provides one example of the operation of a portion of the content access application 179 according to various embodiments. It is understood that the flowchart of FIG. 3 provides merely an example of the many different types of functional arrangements that may be employed to implement the operation of the portion of the content access application 179 as described herein. As an alternative, the flowchart of FIG. 3 may be viewed as depicting an example of steps of a method implemented in the client 106 (FIGS. 1A & 1B) according to one or more embodiments.

Beginning with box 303, the content access application 179 obtains a request to use a content item. For instance, a user may navigate to a user interface 112 (FIGS. 1A & 1B) that presents a content item, and the user may select a "play" button or other similar user interface component. In box 306, the content access application 179 determines whether the content item has been predictively cached in the client 106. If the content item has not been predictively cached in the client 106, or if the predictive caching is incomplete, the content access application 179 may continue to box 309.

In box 309, the content access application 179 obtains a content item initial portion 121 (FIG. 1A) from the content server 139 (FIG. 1B). In box 312, the content access application 179 obtains content item metadata 124 (FIG. 1A) from the content server 139. Such content item metadata 124 may include, for example, manifests 155 (FIG. 1B), decryption keys 157 (FIG. 1B), and/or other metadata. In box 315, the content access application 179 initializes various components in the client 106 to facilitate use of the content items. This may include, for example, launching and/or initializing decoding components 183 and/or decryption components 185, storing decryption keys 157 in the secure data store 187, and/or performing other tasks.

It is noted that performing the tasks of boxes 309-315 may delay playback of the content item relative to the case in which the content item has been predictively cached. The content access application 179 then continues to box 318. If the content access application 179 determines that the content item has been predictively cached, the content access application 179 moves from box 306 to box 318.

In box 318, the content access application 179 begins use of the content item. If the content item was predictively cached, an instantaneous use experience is provided as the delay-inducing tasks of boxes 309-315 were performed in advance. In box 321, the content access application 179 determines whether more data for the content item remains to be streamed or downloaded. If no more data remains, the portion of the content access application 179 ends. If use is not finished, the content access application 179 instead continues to box 324 and obtains a content item subsequent portion 127 (FIG. 1A) from the content server 139. The content item subsequent portion 127 may be identified through processing the manifest 155 for the content item. In box 327, the content access application 179 plays back the content item subsequent portion 127. The content access application 179 then returns to box 321 and determines again whether more data remains to be streamed or downloaded.

Figure 4:
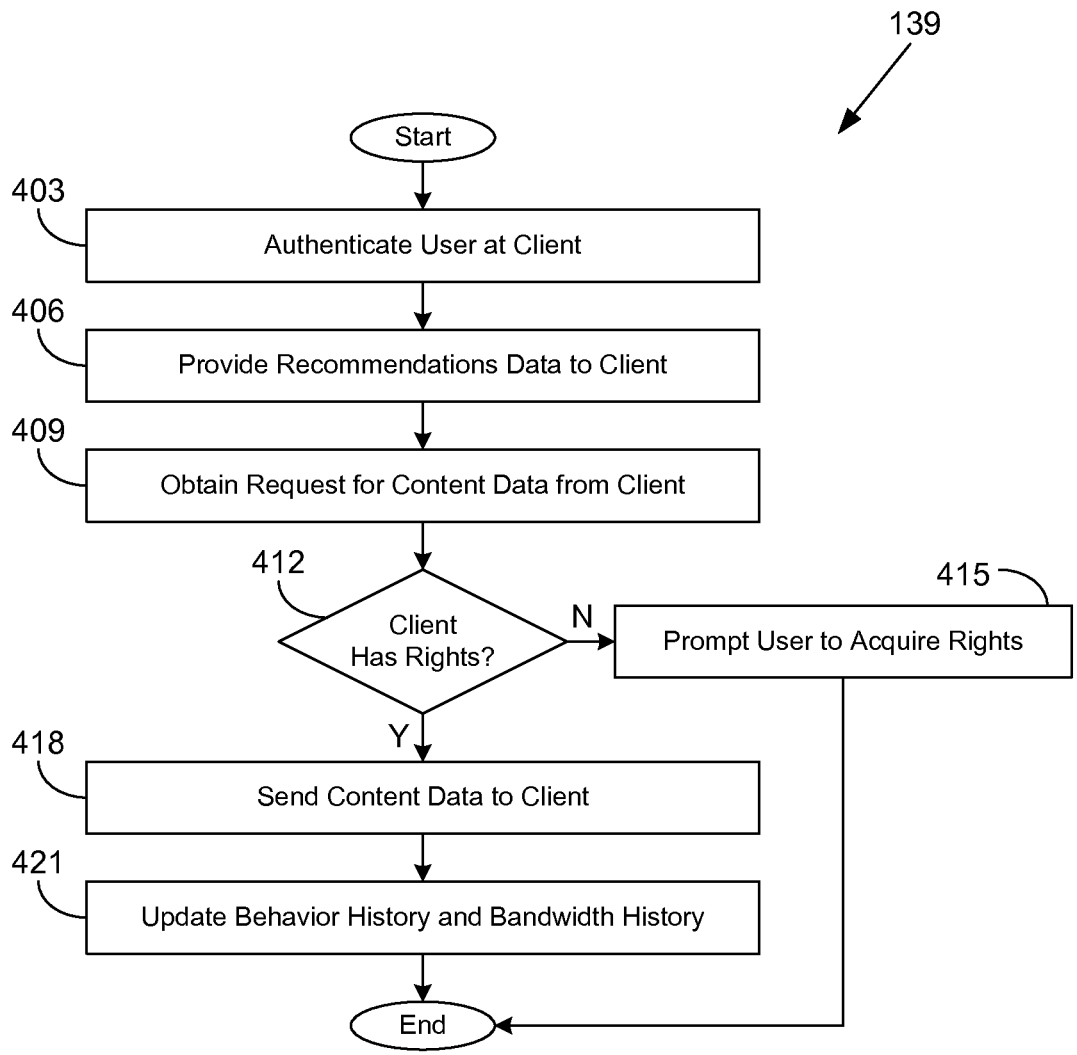
FIG. 4 is a flowchart illustrating one example of functionality implemented as portions of a content server executed in a computing environment in the networked environment of FIG. 1B according to various embodiments of the present disclosure.

Moving on to FIG. 4, shown is a flowchart that provides one example of the operation of a portion of the content server 139 (FIGS. 1A & 1B) according to various embodiments. It is understood that the flowchart of FIG. 4 provides merely an example of the many different types of functional arrangements that may be employed to implement the operation of the portion of the content server 139 as described herein. As an alternative, the flowchart of FIG. 4 may be viewed as depicting an example of steps of a method implemented in the computing environment 103 (FIGS. 1A & 1B) according to one or more embodiments.

Beginning with box 403, the content server 139 authenticates a user at a client 106 (FIGS. 1A & 1B). In some cases, the user may be associated with a subaccount. The authentication may be performed by a cookie, by a username/password combination, and/or by another security credential. In box 406, the content server 139 provides recommendations data 142 (FIG. 1B) to the client 106. In some cases, the content server 139 may provide directives to the client 106 to predictively cache certain content items. In box 409, the content server 139 obtains a request for content data 145 (FIG. 1B) from the client 106. The request may be for content portions 153 (FIG. 1B), manifests 155 (FIG. 1B), decryption keys 157 (FIG. 1B), and/or other content data 145.

In box 412, the content server 139 determines whether the client 106 has rights to the content item to which the content data 145 pertains. If not, the content server 139 may prompt the user to acquire the rights in box 415. For example, the content server 139 may send data encoding a user interface 112 (FIGS. 1A & 1B) to the client 106, where the user interface 112 prompts the user to purchase the content item or a subscription. Thereafter, the portion of the content server 139 ends. In some cases, the encrypted content portions 153 and manifests 155 may be sent to the client 106 without the decryption key 157 if the client 106 does not have the rights.

If the client 106 does have the rights, the content server 139 moves from box 412 to box 418 and sends the content data 145 to the client 106 over the network 109 (FIGS. 1A & 1B). In some cases, the content server 139 may select from multiple bitrates for the content portions 153, multiple languages in the content portions 153, and/or other alternatives based on data such as bandwidth history 164 (FIG. 1B), content preferences 166 (FIG. 1B), etc. The bitrate may be adaptive based at least in part on the currently available bandwidth for the client 106. In box 421, the content server 139 update the behavior history 160 (FIG. 1B), the bandwidth history 164 (FIG. 1B), and/or other data. Thereafter, the portion of the content server 139 ends.

Figure 5:
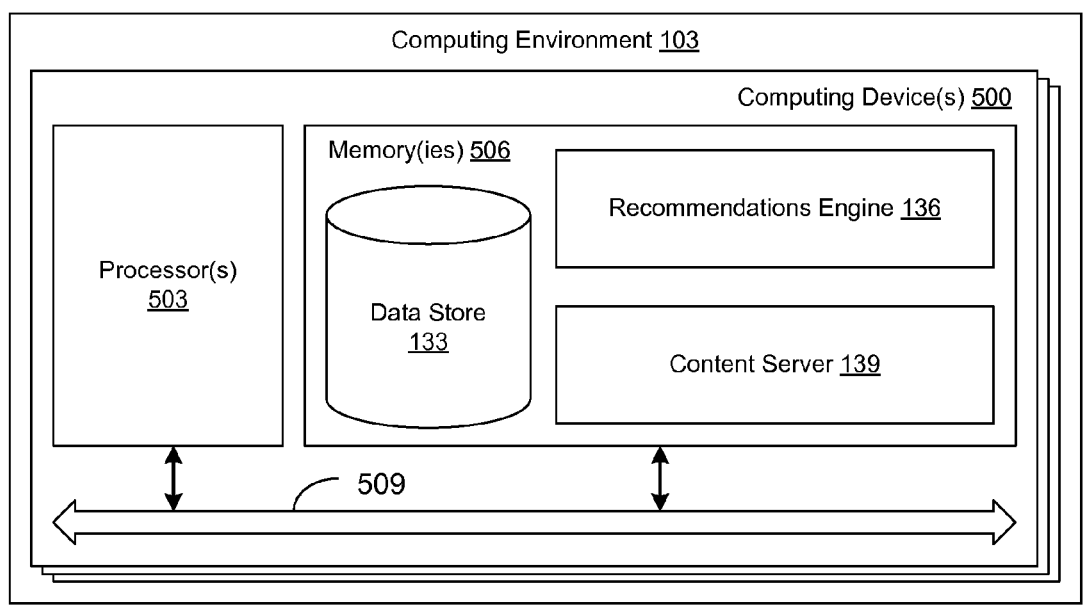
FIG. 5 is a schematic block diagram that provides one example illustration of a computing environment employed in the networked environment of FIGS. 1A and 1B according to various embodiments of the present disclosure.

With reference to FIG. 5, shown is a schematic block diagram of the computing environment 103 according to an embodiment of the present disclosure. The computing environment 103 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the recommendations engine 136, the content server 139, and potentially other applications. Also stored in the memory 506 may be a data store 133 and other data. In addition, an operating system may be stored in the memory 506 and executable by the processor 503. The client 106 (FIGS. 1A & 1B) may correspond to a similar computing device 500 having a processor 503 and memory 506.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the recommendations engine 136, the content server 139, the content access application 179 (FIG. 1B), the predictive caching system 181 (FIG. 1B), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 2-4 show the functionality and operation of an implementation of portions of the predictive caching system 181, the content access application 179, and the content server 139. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 2-4 show a specific order of execution, it is understood that the order of execution may differ from that which is depicted. For example, the order of execution of two or more blocks may be scrambled relative to the order shown. Also, two or more blocks shown in succession in FIGS. 2-4 may be executed concurrently or with partial concurrence. Further, in some embodiments, one or more of the blocks shown in FIGS. 2-4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the recommendations engine 136, the content server 139, the content access application 179, and the predictive caching system 181, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifica- Therefore, the following is claimed:

1. A non-transitory computer-readable medium embodying a program executable in at least one computing device, comprising:
   code that generates a list of recommended media content items for a user based at least in part on a media consumption history of the user and real-time behavior data of the user;
   code that selects a subset of the recommended media content items based at least in part on a respective priority of each of the recommended media content items and an available data storage for a client associated with the user;
   code that prepares the client for instantaneous playback of the subset of the recommended media content items before the user selects any of the subset of the recommended media content items for playback, wherein, for each one of the subset of the recommended media content items, the code that prepares performs:
      obtaining, in the client, a corresponding decryption key, a corresponding manifest, and an initial portion of media content from at least one server; and
      initializing, in the client, decryption logic for decrypting the initial portion of media content using the corresponding decryption key; and
   code that performs instantaneous playback of one of the subset of the recommended media content items in response to the one of the subset of the recommended media content items being selected by the user for playback after the client is prepared for instantaneous playback of the one of the subset of the recommended media content items.

2. The non-transitory computer-readable medium of claim 1, wherein the code that performs instantaneous playback is configured to stream the one of the subset of the recommended media content items from the at least one server.

3. A system, comprising:
   a computing device; and
   a predictive caching system executable in the computing device, the predictive caching system being configured to:
      obtain a list of recommended content items for a user;
      select one of the recommended content items from the list based at least in part on a priority of the one of the recommended content items and an available memory of the computing device;
      obtain an initial portion of the one of the recommended content items and metadata associated with the one of the recommended content items from at least one server prior to the user explicitly indicating that use of the one of the recommended content items is desired; and
      perform processing relative to the metadata to prepare the computing device for playback of the one of the recommended content items prior to the user explicitly indicating that use of the one of the recommended content items is desired.

4. The system of claim 3, wherein the recommended content items correspond to a plurality of media content items, and the use of the one of the recommended content items corresponds to playback of the one of the recommended content items.

5. The system of claim 3, wherein the recommended content items correspond to a plurality of applications, and the use of the one of the recommended content items corresponds to execution of the one of the recommended content items.

6. The system of claim 3, wherein the predictive caching system is further configured to determine a bitrate for the initial portion of the recommended content items based at least in part on a bandwidth profile of the user.

7. The system of claim 3, wherein the predictive caching system is further configured to generate the list of recommended content items based at least in part on a content consumption history of the user.

8. The system of claim 3, wherein the predictive caching system is further configured to generate the list of recommended content items based at least in part on a list of content items created by the user.

9. The system of claim 3, wherein the predictive caching system is further configured to generate the list of recommended content items based at least in part on a listing of content items being presented to the user.

10. The system of claim 9, wherein the listing of content items corresponds to a listing of search results generated in response to a search query obtained from the user.

11. The system of claim 3, wherein the metadata includes a decryption key for decrypting the one of the recommended content items.

12. The system of claim 11, wherein the processing includes adding the decryption key to a secure data store of the computing device, and selecting one of the recommended content items from the list is based at least in part on whether the secure data store has available memory to accommodate the decryption key.

13. The system of claim 11, wherein the processing includes decrypting the initial portion of the one of the recommended content items using the decryption key.

14. The system of claim 11, wherein the processing includes initializing decryption logic for the one of the recommended content items.

15. The system of claim 3, wherein the metadata includes a manifest file identifying a plurality of portions of the one of the recommended content items.

16. The system of claim 3, wherein the predictive caching system is further configured to deallocate resources allocated to a content item from a previous list of recommended content items.

17. The system of claim 16, wherein the resources are deallocated in response to the content item being played back by the user.

18. The system of claim 3, wherein the predictive caching system is further configured to render a user interface that recommends use of the one of the recommended content items to the user in response to the computing device being prepared for use of the one of the recommended content items.

19. A method, comprising:
   determining, in a computing device, that a user is likely to commence use of a content item;
   determining whether the computing device has available resources to facilitate instantaneous use of the content item; and
   in response to determining that the computing device has available resources to facilitate instantaneous use of the content item and before the user commences use of the content item:
      obtaining, in the computing device, metadata for the content item from a server;

obtaining, in the computing device, an initial portion of the content item from the server; and initializing resources of the computing device to facilitate instantaneous use of the content item based at least in part on the metadata and the initial portion of the content item, wherein initializing resources of the computing device includes initializing decryption logic for decrypting the initial portion of the content item using a decryption key.

20. The method of claim 19, wherein initializing resources of the computing device to facilitate instantaneous use of the content item further comprises:

adding the decryption key to a secure data store of the computing device.

21. The method of claim 19, further comprising rendering, in the computing device, a recommendation for the user to use the content item.

22. The method of claim 19, wherein determining, in the computing device, that the user is likely to commence use of the content item further comprises determining, in the computing device, that the user is likely to commence use of the content item based at least in part on a set of content search results being presented to the user.

23. The method of claim 19, wherein determining, in the computing device, that the user is likely to commence use of the content item further comprises determining, in the computing device, the content item based at least in part on a content consumption history of the user.

24. The method of claim 19, wherein determining, in the computing device, that the user is likely to commence use of the content item further comprises determining, in the computing device, the content item based at least in part on a time of day, a day of week, or both.

25. The method of claim 19, wherein determining, in the computing device, that the user is likely to commence use of the content item further comprises obtaining, in the computing device, a list of recommended content items from the server, wherein the list of recommended content items includes the content item.

26. The method of claim 19, wherein determining whether the computing device has available resources to facilitate instantaneous use of the content item further comprises determining whether a secure data store of the computing device has sufficient space to accommodate the decryption key.

27. The method of claim 19, wherein determining whether the computing device has available resources to facilitate instantaneous use of the content item further comprises determining whether a predictive cache in the computing device has sufficient space to accommodate the metadata and the initial portion of the content item.

28. The method of claim 19, further comprising commencing instantaneous use of the content item in the computing device in response to a user-initiated use request after the resources of the computing device have been initialized to facilitate instantaneous use of the content item.

29. The method of claim 19, wherein the user is one of a plurality of users associated with a content access account.

* * * * *